United States Patent
Hong

(10) Patent No.: US 9,918,207 B2
(45) Date of Patent: Mar. 13, 2018

(54) METHOD FOR PROCESSING RECEIVED MESSAGE AND ELECTRONIC DEVICE IMPLEMENTING THE SAME

(71) Applicant: Samsung Electronics Co., Ltd., Gyeonggi-do (KR)

(72) Inventor: Sungwoo Hong, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/740,471

(22) Filed: Jun. 16, 2015

(65) Prior Publication Data

US 2015/0373514 A1    Dec. 24, 2015

(30) Foreign Application Priority Data

Jun. 20, 2014    (KR) .................. 10-2014-0075435

(51) Int. Cl.
*H04W 4/00*    (2009.01)
*H04W 4/12*    (2009.01)
*H04W 68/00*    (2009.01)
*H04W 88/02*    (2009.01)

(52) U.S. Cl.
CPC ........... *H04W 4/12* (2013.01); *H04W 68/005* (2013.01); *H04W 88/02* (2013.01)

(58) Field of Classification Search
CPC ...... H04W 4/12; H04W 68/005; H04W 88/02
USPC ....................................................... 455/466
See application file for complete search history.

(56) References Cited

U.S. PATENT DOCUMENTS

| 5,377,188 A * | 12/1994 | Seki ................ H04L 1/1657 370/390 |
| 8,601,576 B2 * | 12/2013 | Jeon ............... G06Q 10/107 709/224 |
| 2005/0020289 A1 * | 1/2005 | Kim ................ H04L 12/585 455/466 |
| 2008/0009299 A1 * | 1/2008 | Ryu ..................... H04W 4/14 455/466 |

(Continued)

FOREIGN PATENT DOCUMENTS

KR    10-1089390 B1    12/2011

OTHER PUBLICATIONS

Nicole Cozma, "NetQin Mobile Manager for Android", https://www.cnet.com/how-to/how-to-ignore-texts-on-android/https://www.youtube.com/watch?v=dtuCdNUct.19E, 6 pages.

(Continued)

*Primary Examiner* — Amancio Gonzalez
(74) *Attorney, Agent, or Firm* — Cha & Reiter, LLC.

(57) ABSTRACT

Disclosed herein are an electronic device and a method for processing messages. The electronic device includes a display unit, a communication unit configured to receive a message from an external device, a storage unit storing a message source list and an unregistered message box, and a control unit configured to determine whether source information of the received message is registered in the message source list, if the source information is not registered in the message source list, store the message in the unregistered message box, and if the source information is registered in the message source list, display by the display unit at least a part of the received message.

30 Claims, 12 Drawing Sheets

(56) References Cited

U.S. PATENT DOCUMENTS

| | | | |
|---|---|---|---|
| 2011/0151850 A1* | 6/2011 | Haaparanta | H04M 1/2745 |
| | | | 455/415 |
| 2012/0157066 A1* | 6/2012 | Hwang | H04M 1/274516 |
| | | | 455/414.2 |
| 2013/0024779 A1 | 1/2013 | Bechtel et al. | |
| 2015/0074802 A1 | 3/2015 | Sanjeev et al. | |
| 2015/0156300 A1* | 6/2015 | Park | H04L 63/1483 |
| | | | 455/414.1 |
| 2015/0227249 A1* | 8/2015 | Kim | G06F 1/1616 |
| | | | 345/173 |

OTHER PUBLICATIONS

"Extreme Call Blocker Droid App", https://www.youtube.com/watch?v=XhWuDnjx84Y.

* cited by examiner

METHOD FOR PROCESSING RECEIVED MESSAGE AND ELECTRONIC DEVICE IMPLEMENTING THE SAME

CLAIM OF PRIORITY

This application claims the benefit under 35 U.S.C. § 119(a) of a Korean patent application filed on Jun. 20, 2014 in the Korean Intellectual Property Office and assigned Serial number 10-2014-0075435, the entire disclosure of which is hereby incorporated by reference.

TECHNICAL FIELD

Various embodiments of the present disclosure relate to a method for processing a received message and an electronic device implementing the same.

BACKGROUND

An electronic device, such as a smart phone, a tablet PC, or the like may transmit and receive message (e.g., a SMS, a MMS, or a SNS message) with an external device.

SUMMARY

Message considered unnecessary (e.g., a spam message, or "smishing" SMS-based phishing message) may be filtered. For example, message relaying servers or equipment (e.g., a base station) may receive a message from a source, and, if the message is to be filtered, may refrain from sending the message to a designated destination. The filtering may be implemented according to relation to "registered spam information" (e.g., such as restricted phone number, restricted text, etc.). In another example, an electronic device may receive a message from an external device, and if the message matches the "registered spam information," the electronic device may automatically delete the message without displaying the received message.

However, such a filtering method may be frustrated or otherwise neutralized by a simple change in the registered spam information (e.g., a change in a spam-registered phone number, text, or imaging of text). In such cases, user may be inadvertently exposed to the altered spam messages.

Meanwhile, the filtering of messages may be vary depending on a particular user's preferences or configurations. For example, in case of an advertisement, a certain user may consider it as a spam, while other users may not. In addition, if a certain user is interested in, for example, a "joint purchase", an advertising message related to the "joint purchase" may not be considered spam message for the certain user. The filtering of messages may also vary according to time. For example, if a certain user is no longer interested in the joint purchase, the advertising message related to the joint purchase may be designated as a spam message for the certain user. Thus, the need for a certain message is not common to all people. If so, a certain user may be unable to verify a message that may be necessary for a relevant user due to such a filtering function.

The present disclosure provides an electronic device and method for processing a message that can accurately filter out a message necessary for a user and an electronic device implementing the same.

In one aspect of this disclosure, a method for processing a message received from an external in an electronic device is disclosed, the method including receiving a message from an external device, detecting whether source information of the received message is registered in a message source list, and if the source information of the received message is unregistered in the message source list, storing the received message in an unregistered message box configured to store unregistered messages.

In another aspect of this disclosure, an electronic device is disclosed including a display unit, a communication unit configured to receive a message from an external device, a storage unit storing a message source list and an unregistered message box, and a control unit configured to: determine whether source information of the received message is registered in the message source list, if the source information is not registered in the message source list, store the message in the unregistered message box, and if the source information is registered in the message source list, display by the display unit at least a part of the received message.

BRIEF DESCRIPTION OF THE DRAWINGS

The present disclosure will be more apparent from the following detailed description in conjunction with the accompanying drawings, in which.

DETAILED DESCRIPTION

Figure 1:
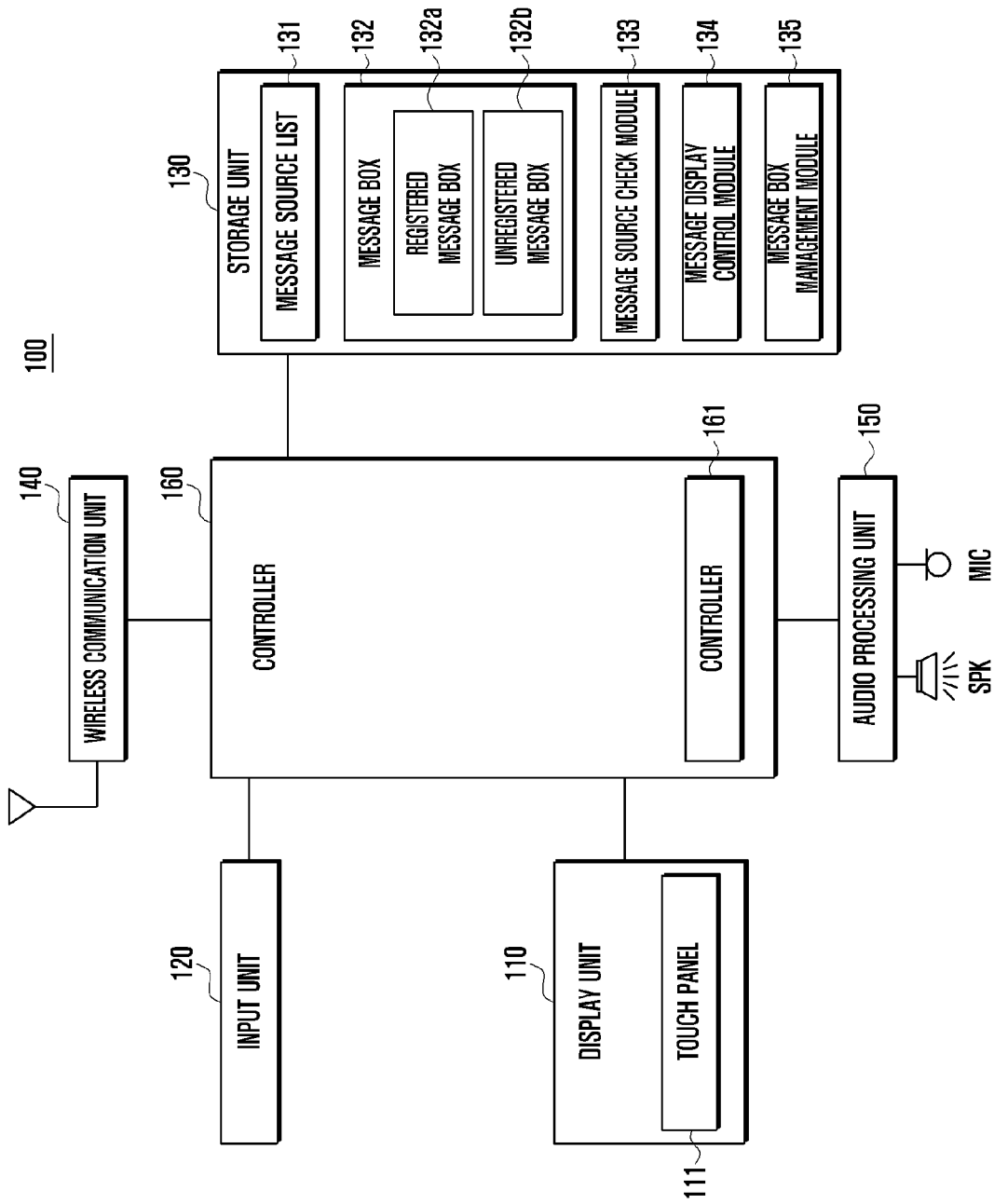
FIG. 1 is a block diagram illustrating a configuration of an example electronic device according to various embodiments of the present disclosure.

Hereinafter, various embodiments of the present disclosure are described with reference to the accompanying drawings. It should be apparent to those of ordinary skilled in the art will recognize that the following description of various changes and modifications of the various embodiments described herein can be made without departing from the scope and spirit of the present disclosure is provided for illustration purpose and not for the purpose of limiting the present disclosure as defined by the appended claims and their equivalents. The same reference numbers are used throughout the drawings to refer to the same or like parts.

The expressions such as "include" and "may include" which may be used in various embodiments of the present disclosure denote the presence of the disclosed functions, operations, and constituent elements and do not limit one or more additional functions, operations, and constituent elements. In various embodiments of the present disclosure, the terms such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in various embodiments of the present disclosure, the expression "and/or" includes any and all combinations of the associated listed words. For example, the expression "A and/or B" may include A, may include B, or may include both A and B.

In various embodiments of the present disclosure, expressions including ordinal numbers, such as "first" and "second," or the like, may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them the first user device and the second user device are user devices. For example, a first element could be termed a second element, and similarly, a second element could be also termed a first element without departing from the scope of various embodiments of the present disclosure.

In the case where according to which a component is referred to as being "connected" or "accessed" to other component, it should be understood that not the component is directly connected or accessed to the other component, but also there may exist another component between them the component and the other component. Meanwhile, in the case where according to which a component is referred to as being "directly connected" or "directly accessed" to other component, it should be understood that there is no component therebetween.

The terms used in various embodiments of the present disclosure are used to describe specific various embodiments, and are not intended to limit various embodiments of the present disclosure. As used herein, the singular forms are intended to include the plural forms as well, unless the context clearly indicates otherwise.

Unless defined otherwise, the terms including technical and scientific terms used in this specification may have the meaning that can be commonly apprehended by those skilled in the art. The terms, such as the terms defined in the commonly-used dictionary, are to be interpreted based on the context of the related technology and are not to be interpreted ideally or excessively unless obviously defined otherwise in various embodiments of the present disclosure.

An electronic device according to various embodiments of the present disclosure may be a device including a communication function. For example, the device may include at least one of a smartphone, a tablet Personal Computer (PC), a mobile phone, a video phone, an e-book reader, a desktop PC, a laptop PC, a netbook computer, a Personal Digital Assistant (PDA), a Portable Multimedia Player (PMP), a digital audio player, a mobile medical device, a camera, or a wearable device (e.g., head-mounted-device (HMD) such as electronic glasses, an electronic garment, an electronic bracelet, an electronic necklace, an electronic accessory, an electronic tattoo, or a smart watch).

According to various embodiments of the present disclosure, an electronic device may be a smart home appliance including a communication function. For example, the smart home appliance may include at least one of a TeleVision (TV), a Digital Video Disk (DVD) player, an audio device, a refrigerator, an air-conditioner, vacuum, an oven, a microwave, a washing machine, an air cleaner, a set-top box, a TV box (e.g., Samsung HomeSync™, Apple TV™, or Google TV™), game consoles, an electronic dictionary, an electronic key, a camcorder, or an electronic frame.

According to various embodiments of the present disclosure, an electronic device may include at least one of various medical devices (e.g., Magnetic Resonance Angiography (MRA), Magnetic Resonance Imaging (MRI), Computed Tomography (CT), a scanning machine, an ultrasonic wave device, and the like), a navigation device, a Global Positioning System (GPS) receiver, an Event Data Recorder (EDR), a Flight Data Recorder (FDR), vehicle infotainment device, an electronic equipment for a ship (e.g., navigation equipment for a ship, gyrocompass, or the like), avionics, a security device, a vehicle head unit, an industrial or household robot, an Automatic Teller's Machine (ATM) of financial institution, or a Point of Sales (POS) of a store.

According to various embodiments of the present disclosure, an electronic device may include at least one of furniture or a portion of a building/structure that includes a communication function, an electronic board, an electronic signature receiving device, a projector, or various measuring instruments (e.g., water, electricity, gas, or electric wave measuring equipment, and the like). An electronic device according to various embodiments of the present disclosure may be a combination of at least one of the aforementioned various devices. In addition, an electronic device according to various embodiments of the present disclosure may be a flexible device. In addition, it is obvious to those skilled in the art that the electronic device according to various embodiments of the present disclosure is not limited to the aforementioned devices.

Hereinafter, an electronic device according to various embodiments of the present disclosure is described with reference to the accompanying drawings. The term user used in various embodiments of the present disclosure may refer to a person who uses an electronic device or a device (e.g., an artificial intelligence electronic device) that uses an electronic device.

FIG. 1 is a block diagram illustrating an example configuration of an electronic device according to various embodiments of the present disclosure.

Referring to FIG. 1, an electronic device 100 according to various embodiments of the present disclosure may include a display unit 110, an input unit 120, a storage unit 130, a wireless communication unit 140, an audio processing unit 150, a speaker (SPK), a microphone (MIC), and a controller 160.

The display unit 110 may display various information on a screen under the control of the controller 160. The display unit 110 may include a display panel or a hologram. The display panel may be, for example, a liquid-crystal display (LCD) and an active-matrix organic light-emitting diode (AM-OLED), or the like. The display panel may be implemented so as to be, for example, flexible, transparent, or wearable. The display panel may include a "touch panel 111" which is an input unit for the interaction between a user and the electronic device 100. Thus, the display unit 110 may be referred to as a touch screen. The touch panel 111 may be implemented as an add-on type which is placed on a screen of the display unit 110 or an on-cell type or an in-cell type which is inserted into the display unit 110. The touch panel 111 may detect a user input (e.g., a display request of received message) through, for example, at least one of a capacitive type, a resistive type, an infrared type or an ultrasonic type, and generate an event corresponding to the user input to transmit to the controller 160. The hologram may show a three-dimensional image in the air by using the interference of light. The display unit 110 may further include a control circuit to control the display panel or the hologram.

The input unit 120 may be different from the touch panel 111 installed in the display unit 110 and may include, for example, a touch key. The touch key may be able to recognize the touch or approach of a human body and an object. The input unit 120 may generate an event in response to the user input, and transmit it to the controller 160. The input unit 120 may be implemented by further including a different type of key in addition to a touch type. For example, the input unit 120 may be implemented by including at least one dome key. When user presses down on a dome key, the dome key may be deformed to contact a printed circuit board. Accordingly, an event may occur in the printed circuit board, and may be transmitted to the controller 160.

The storage unit 130 may store data (e.g., SMS, MMS, SNS message, e-mail) generated by the electronic device 100 or received from external device through the wireless communication unit 140 under the control of the controller 160. The storage unit 130 may store a boot program, at least one operating system, and applications. In addition, the storage unit 130 may store various setting information (e.g., the screen brightness, the activation of notification of message from unregistered source, the activation of unregistered message box, the indication of message-related information from unregistered source, and the like) for setting the operating environment of the electronic device 100. Accordingly, the controller 160 may operate the electronic device 100 by referring to the setting information.

The storage unit 130 may include a main memory and a secondary memory. The main memory may be implemented by, for example, a RAM. The secondary memory may be implemented by a disk, a RAM, a ROM, a flash memory, or the like. The main memory may store various programs loaded from the secondary memory, for example, a boot program, an operating system and applications. When the power of the battery is supplied to the controller 160, the boot program may be firstly loaded into the main memory. The boot program may load the operating system into the main memory. The operating system may load the application into the main memory. The controller 160 may access the main memory and decode an instruction (routine) of a program, and execute the function according to the decoding result.

The storage unit 130 may further include an external memory. For example, the storage unit 130 may include a compact flash (CF), a secure digital (SD), a micro secure digital (Micro-SD), a mini secure digital (Mini-SD), an extreme digital (xD), a MemoryStick, or the like, as an external memory.

According to various embodiments of the present disclosure, the storage unit 130 may store a message source list 131, a message box 132, a message source check module 133, a message display control module 134, and a message box management module 135.

The message source list 131 may include a plurality of source information. Each source information may include, for example, e-mail address, sender's name, phone number, home address, work address, nickname, identifier (e.g., ID used in a social network), and the like. Here, the source may be referred to as a contact. In addition, the message source list may also be referred to as an address book or a contact list. The update (e.g., the deletion or edition of at least a portion of existing source information, the addition of new source information to the list) of the message source list 131 may be accomplished by the user's request. For example, the controller 160 may receive user request through the input unit 120, or the touch panel 111. Alternatively, the controller 160 may receive user request from a microphone (MIC) through the audio processing unit 150. Alternatively, the controller 160 may receive user request from an external input unit (e.g., a wireless keyboard, a wireless headset with a microphone) through the wireless communication unit 140. The controller 160 may update the message source list 131 in response to user request.

According to various embodiments of the present disclosure, the message source list may be stored in an external storage device (e.g., cloud server), not in the electronic device 100. Alternatively, the external storage device may store a separate message source list which is at least partially identical (e.g., part of source information is identical) with the message source list 131. Alternatively, the external storage device may store a separate message source list different from the message source list 131. In this case, the controller 160 may access to the message source list stored in the external storage device, through the wireless communication unit 140.

The message box 132 may include a registered message box 132*a* and an unregistered message box 132*b*. Here, 'unregistered' may indicate that it cannot be determined whether the received message is a spam message, as the source information of the received message does not exist (e.g., is not registered) in the message source list 131 (or in the external message source list). Alternatively, 'unregistered' may mean It cannot be determined whether the received message is a spam message as the source of the received message is not registered (e.g., source information does not exist in the received message). "Registered" may indicate that the received message is to be classified as a normal message for a certain user (i.e., user of the electronic device 100) and not as a spam message, because the source information of the received message exists (e.g., is registered) within the message source list 131 (or in the external message source list)". If so, the unregistered message box 132*b* may include a message received from "source that does not exist in the message source list 131 (or in the external message source list)". In addition, the unregistered message box 132*b* may include a message received by the electronic device 100 without source information. The registered message box 132*a* may include a message received from "source that exists in the message source list 131 (or in the external message source list)".

According to various embodiments of the present disclosure, the messages stored in message box 132 may include, respectively, attribute information indicating whether it is registered. Alternatively, message box 132 may include 'attribute information' corresponding to each of the stored messages. In this case, it is not necessary that message box 132 should be classified and managed into the registered message box 132*a* and the unregistered message box 132*b*. According to various embodiments of the present disclosure, if the source information of unregistered message is added to the message source list 113, the controller 160 may change (e.g., move from the unregistered message box 132b to the registered message box 132a or change the attribute information) the attribute of corresponding message from 'unregistered' to 'registered'.

According to various embodiments of the present disclosure, the message may include information that indicates whether a corresponding message is seen by user. Alternatively, message box 132 may include "information that indicates whether a corresponding message is seen by user" corresponding to each of the stored messages. For example, if a corresponding message is displayed on the screen, the controller 160 may set this state as a state in which the corresponding message has seen by user.

According to various embodiments of the present disclosure, the controller 160 may change the attribute of unregistered message to 'registered', if the user has seen the unregistered message.

According to various embodiments of the present disclosure, the unregistered message may be automatically deleted. For example, the controller 160 may determine whether the state of message satisfies a specific condition. If the state of message satisfies a specific condition, the controller 160 may delete the unregistered message from the message box 132. Here, the case of satisfying a specific condition may include the cases of "a certain period of time (e.g., one day) is elapsed after receiving", "unregistered message is seen by user", "a certain period of time (e.g., a half-day) is elapsed after unregistered message is seen by user", or "not changing to 'registered' although a certain period of time is elapsed".

According to various embodiments of the present disclosure, the unregistered message may be moved from the unregistered message box 312b to a spam box (not shown), if the condition satisfies a specific condition. For example, in the case of "message is not seen by user although a certain period of time is elapsed after receiving", or "not changing to 'registered' although a certain period of time is elapsed", the controller 160 may move the unregistered message to the spam box (not shown). In other words, the state of the unregistered message may be changed into the spam message.

The message source check module 133 may be set to enable the controller 160 to execute a function that determines whether the source of message is registered (in other words, whether message is registered). The message display control module 134 may be set to enable the controller 160 to execute a function that controls the display of message. The message box management module 135 may be set to enable the controller 160 to execute a function that manages message box 132.

The wireless communication unit 140 may perform voice communication, video call, or data communication with an external device through network under the control of the controller 160. The wireless communication unit 140 may include a mobile communication module (e.g., a 3-Generation mobile communication module, a 3.5-Generation mobile communication module or a 4-Generation mobile communication module, etc.), a digital broadcasting module (e.g., a DMB module), and a short-range communication module (e.g., a Wi-Fi module, a Bluetooth module, a Near Field Communication "NFC" module).

The audio processing unit 150 may perform input and output of audio signal (e.g., voice data) for voice recognition, voice recording, digital recording, and call, in combination with the speaker (SPK) and the microphone (MIC). The audio processing unit 150 may receive the audio signal (e.g., voice data) from the controller 160, D/A convert the received audio signal into an analog signal, and amplify and output to the speaker (SPK). The speaker (SPK) may convert and output the audio signal received from the audio processing unit 150 into sound wave. The microphone (MIC) which is another input unit may convert the sound wave transmitted from a person or other sound source into an audio signal. The audio processing unit 150 may transmit the audio signal received from the microphone (MIC) to the controller 160 after converting into digital signal through A/D conversion.

The audio processing unit 150 may provide an audible feedback related to message reception under the control of the controller 160. For example, if unregistered message is received, the audio processing unit 150 may output voice data or sound data to guide this.

The controller 160 may control the overall operation of the electronic device 100 and the signal flow between the internal configurations of the electronic device 100, process data, and control the supply of power from battery to the above configurations. The controller 160 may include a processor 161. The processor 161 may include an application processor (AP), a communications processor (CP), and a graphic processing unit (GPU). The processor 161 may implement a message processing method by using the modules 133~135. Hereinafter, the message processing method according to various embodiments of the present disclosure is described in detail.

Meanwhile, the electronic device 100 may further include configurations that are not mentioned above, such as an ear jack, a proximity sensor, an illumination sensor, a GPS reception module, or the like. In addition, the electronic device 100 may further include an interface unit for a wired connection with external device. The interface unit may be coupled with external device in a wired manner (e.g., a USB cable). Then, the controller 160 may perform data communication with external device through the interface unit.

Figure 2:
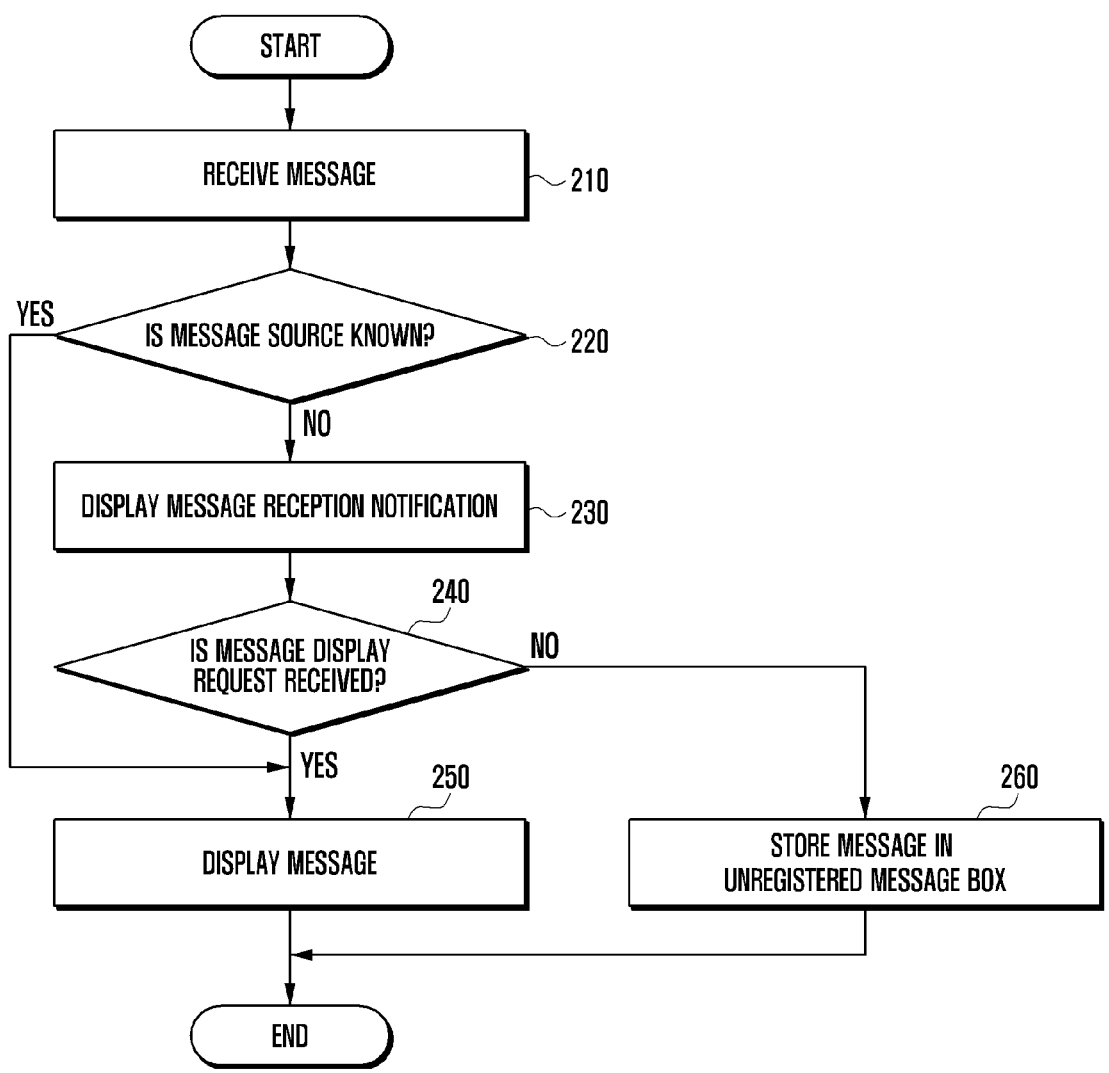
FIG. 2 is a flowchart illustrating an example method for processing a message according to various embodiments of the present disclosure.
Figure 3:
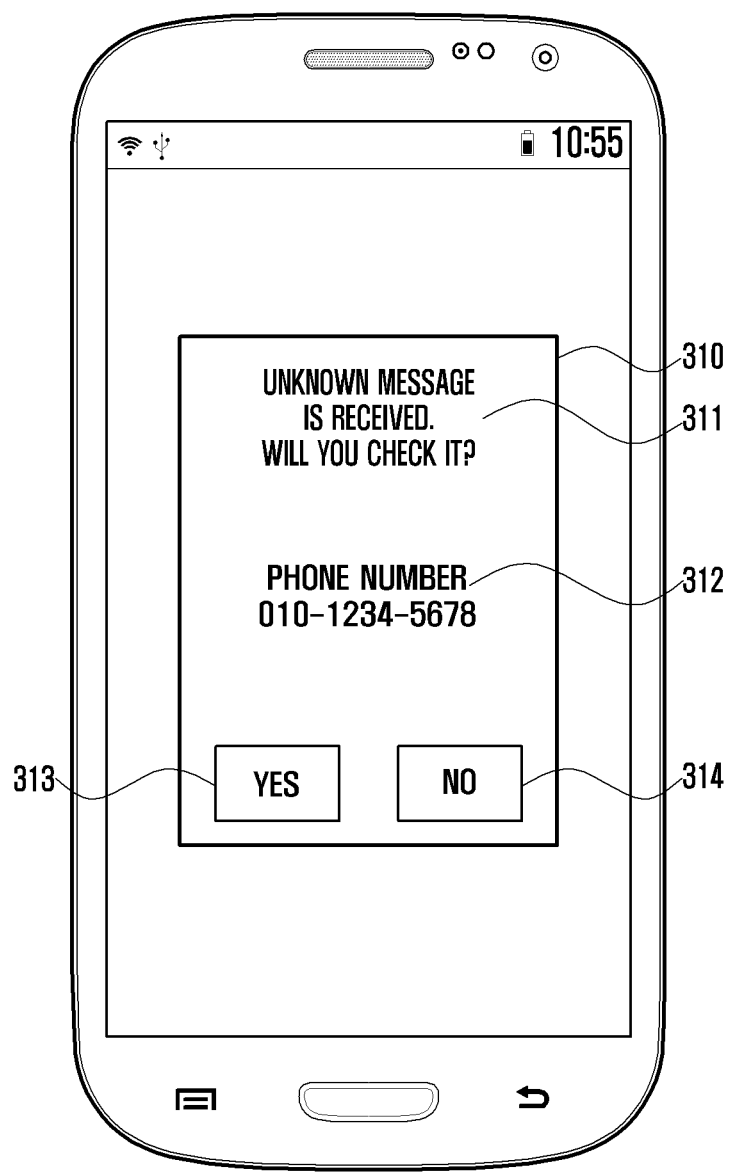
FIG. 3 illustrates an example notification screen according to one embodiment of the present disclosure.

FIG. 2 is a flowchart illustrating an example method for processing a message according to various embodiments of the present disclosure. FIG. 3 illustrates an example notification screen according to the method for processing a message of FIG. 2.

Referring to FIG. 2, at operation 210, the controller 160 may receive a message from the external device through the wireless communication unit 140. The message may be received by the electronic device 100 together with source information (e.g., telephone number).

At operation 220, the controller 160 may determine whether the source of message is known (e.g., whether source information for the received message exists in the message source list 131). For example, the controller 160 may check the message source list 131, and may determine (e.g., detect) whether the received source information exists in the message source list 131. Additionally or alternatively, the controller 160 may transmit an authentication request message including the received source information to the external storage device through the wireless communication unit 140. The external storage device may determine whether the source information received from the electronic device 100 exists in a message source list of the external storage device, and send a response message including the determination result (e.g., information indicating successful authentication or non-authentication) to the electronic device 100. If the source does not exist in the list, it is determined that the source is registered. Otherwise, it is determined that the source is not registered.

On the other hand, the message may be received without the source information. Then, the source of message may be determined to be unregistered. Alternatively, the controller 160 may control the wireless communication unit 140 to transmit a message requesting the source information of a corresponding message to a message relay device (e.g., a base station). The controller 160 may determine whether the source of a corresponding message is registered by using the source information received from the message relay device.

If the source of message is known (e.g., in other words, if the message is registered), the controller 160 may perform an operation 250 to display the message (which will be described in greater detail later).

If the source of message is unknown (e.g., in other words, if the message is not registered), the controller 160 may control the display unit 110 to display a "message reception notification" at operation 230. Referring to FIG. 3, the message reception notification may be displayed as, for example, a pop-up window 310. The pop-up window 310 may include a guide 311 indicating to a user that the source of received message is not known. Source information 312 (e.g., in this example, a telephone number) may also be displayed, which may aid the user in identifying a source of the message. Buttons 313 and 314 may enable a user to select a display of message.

Independently of a display of message reception notification (e.g., a pop-up window 310), the controller 160 may control the audio processing unit 150 to output sound or voice data.

The controller 160 may determine whether message display request is received from an input unit (e.g., the input unit 120, the touch panel 111, the microphone (MIC) or an external input) at operation 240.

If the message display request is received (e.g., if a "touch event" according to the selection of "Yes" button 313 by user is received from the touch panel 111), the controller 160 may control the display unit 110 to display a message at operation 250. Additionally, the controller 160 may register (e.g., store) the message in the unregistered message box 132b. If message box 132 is not classified into the registered message box 132a and the unregistered message box 132b, the controller 160 may store the attribute information indicating 'unregistered' in message box 132 together with message. In addition, the controller 160 may set (e.g., store "information indicating that message is seen by user" in a box together with a corresponding message) the unregistered message as a message which is seen by user.

Meanwhile, as a determination result of the operation 220, if the source of message is known, the controller 160 may control the display unit 110 to display a message (i.e., registered message) at operation 250. For example, the controller 160 may control the display unit 110 to display at least a part of registered message and the source information. If an entire display request is received from the input unit, in response to this, the controller 160 may control the display unit 110 to display the entire content of the registered message. As another example, the controller 160 may control the display unit 110 to display the source information of the registered message. If the message display request is received from the input unit, in response to this, the controller 160 may control the display unit 110 to display the entire content of the registered message.

As a determination result of the operation 240, if the message display request is not received (e.g., in other words, if the user's response to the reception notification is 'message display reject' as indicated by a "touch event" detected by the touch panel 111 selecting the "No" button 314), the controller 160 may terminate the display of message reception notification, and register (e.g., store) the message in the unregistered message box 132b at operation 260. If message box 132 is not classified into the registered box 132a and the unregistered message box 132b, the controller 160 may store the attribute information indicating 'unregistered' in message box 132 together with message. In addition, the controller 160 may set the unregistered message as an "unread" message which has not yet seen by user by storing information indicating as such, such as a flag or data marker indicating an "unread" status, together with the corresponding message.

According to various embodiments of the present disclosure, if the user's response to the reception notification is 'message display request,' the controller 160 may set an attribute of the received message from "unregistered" to "registered." In other words, the controller 160 may register the received message in the registered box 132a. That is, the user indicates is not interested is treated as spam. In addition, the source of such message treated as spam may be registered in a spam list.

Figure 4:
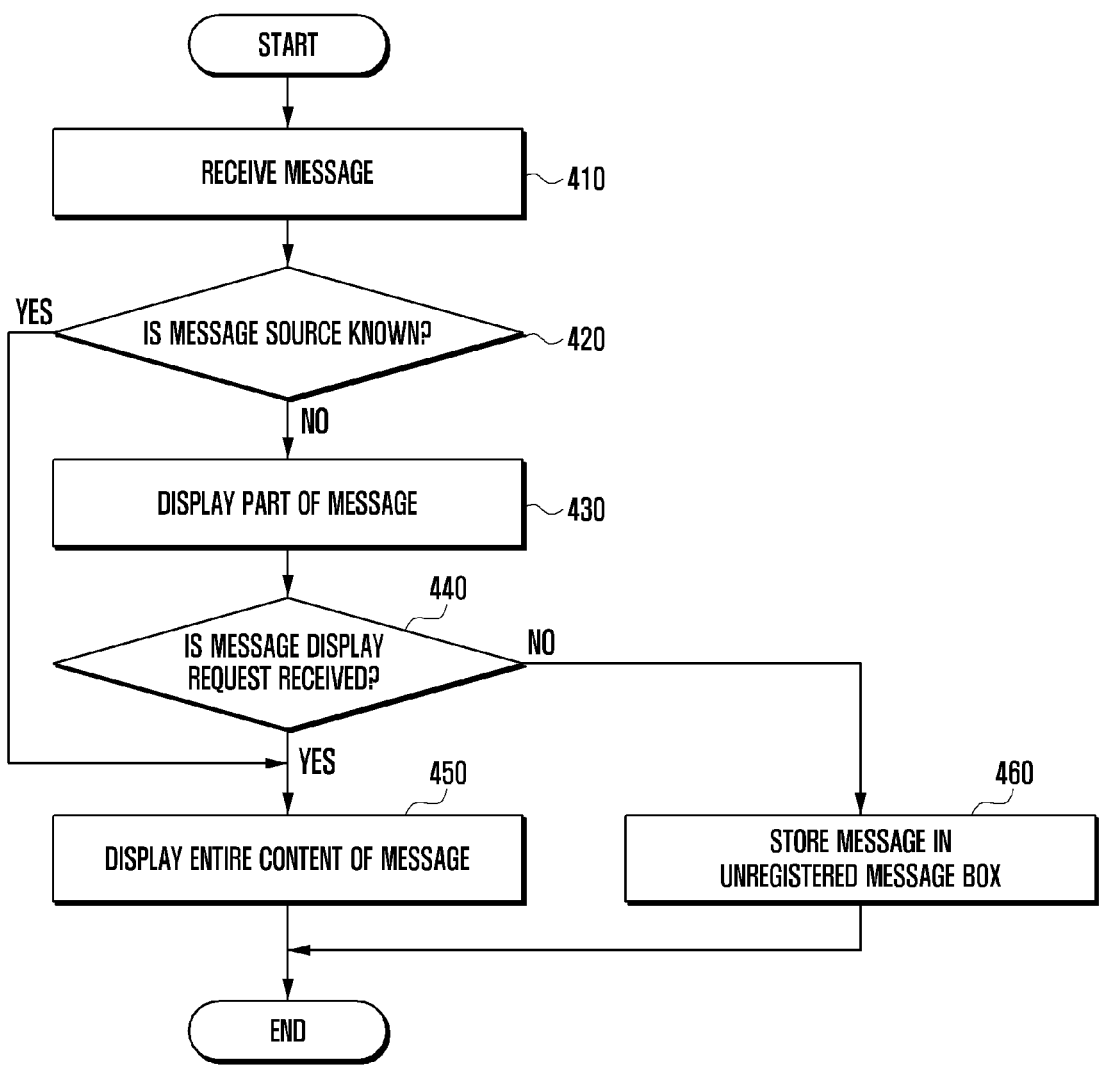
FIG. 4 is a flowchart illustrating an example method for processing a message according to various embodiments of the present disclosure.
Figure 5:
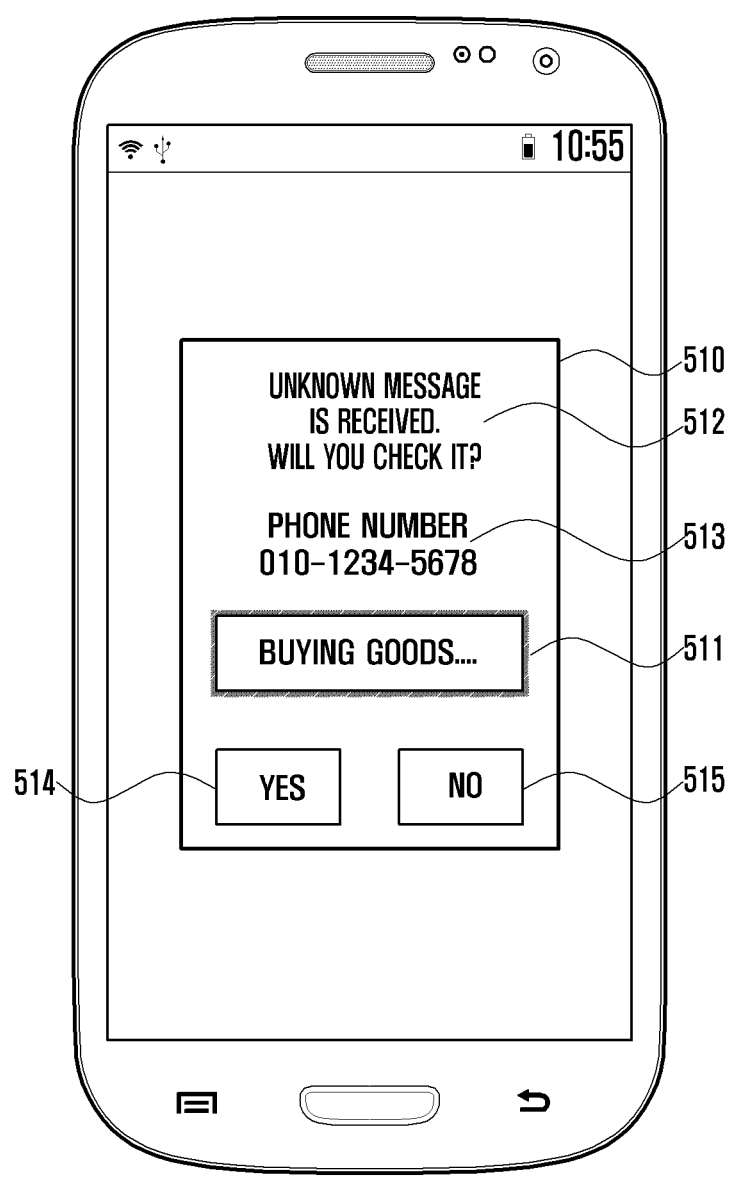
FIG. 5 illustrates an example notification screen according to one embodiment of the present disclosure.

FIG. 4 is a flowchart illustrating an example method for processing a message according to various embodiments of the present disclosure. FIG. 5 illustrates an example notification screen according to the method for processing a message of FIG. 4.

Referring to FIG. 4, at operation 410, the controller 160 may receive a message from the external device through the wireless communication unit 140. At operation 420, the controller 160 may determine whether the source of message is known. If the source of message is known, the controller 160 may perform an operation 450 to display the content of the message (which will be described later).

If the source of message is not known, the controller 160 may control the display unit 110 to display at least a part of message at operation 430. Referring to FIG. 5, the display unit 110 may display, for example, a pop-up window 510 including a part 511 of message, which may be a preview portion of the total message. The pop-up window 500 may further include a guide 512 indicating to a user that the source of received message is not known, source information 513 showing an attribute of the received message (e.g., telephone number), and buttons 514 and 515 enabling a user to select a displayed button, toggle or input of the displayed message.

At operation 440, the controller 160 may determine whether message display request is received, such as selection of the "Yes" button 514. If the message display request is received, the controller 160 may control the display unit 110 to display an entire content of message at operation 450.

Meanwhile, as a determination result of the operation 420, if the source of message is known, the controller 160 may control the display unit 110 to display a message (i.e., registered message) at operation 450. As another example, the controller 160 may control the display unit 110 to display at least a part of registered message and the source information. If an entire display request is received from the input unit, in response to this, the controller 160 may control the display unit 110 to display the entire content of the registered message. As another example, the controller 160 may control the display unit 110 to display the source information of the registered message. If the message display request is received from the input unit, in response to this, the controller 160 may control the display unit 110 to display the entire content of the registered message.

As a determination result of the operation 440, if the message display request is not received such as if a selection of "No" 515 is detected, the controller 160 may terminate display of partial message, and store the message (i.e., as an unregistered message) in the unregistered message box 132*b* at operation 460.

Figure 6:
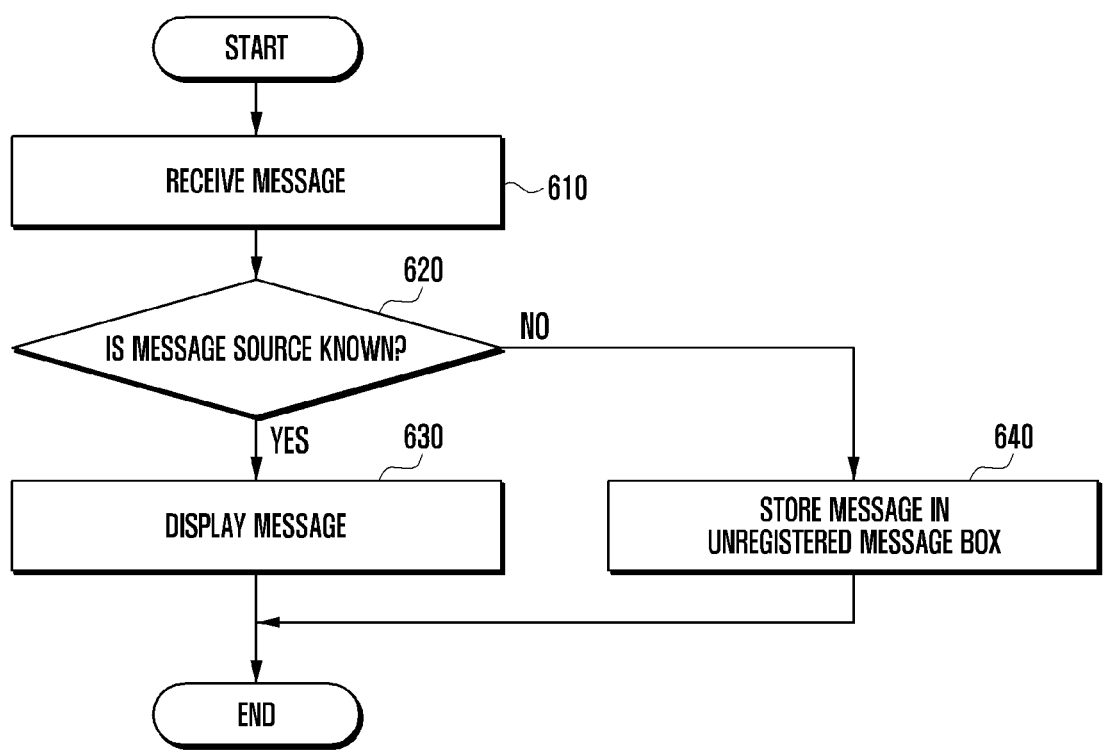
FIG. 6 is a flowchart illustrating an example method for processing a message according to various embodiments of the present disclosure.

FIG. 6 is a flowchart illustrating an example method for processing a message according to various embodiments of the present disclosure.

Referring to FIG. 6, at operation 610, the controller 160 may receive a message from the external device through the wireless communication unit 140. At operation 620, the controller 160 may determine whether the source of message is known. If the source of message is known (in other words, if the message is registered), the controller 160 may control the display unit 110 to display a message (i.e., registered message) at operation 630.

If the source of message is not known (in other words, if the message is not registered), the controller 160 may store the message (i.e., unregistered message) in the unregistered message box 132*b* at operation 640.

Figure 7:
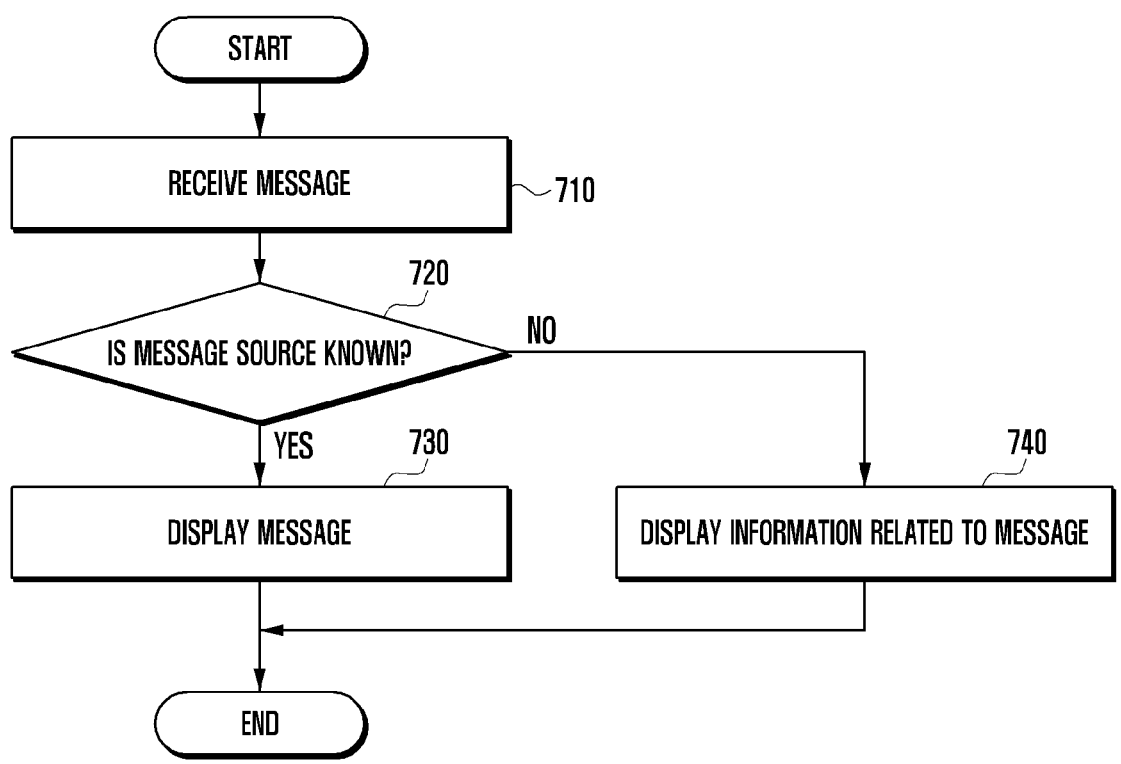
FIG. 7 is a flowchart illustrating an example method for processing a message according to various embodiments of the present disclosure.
Figure 8:
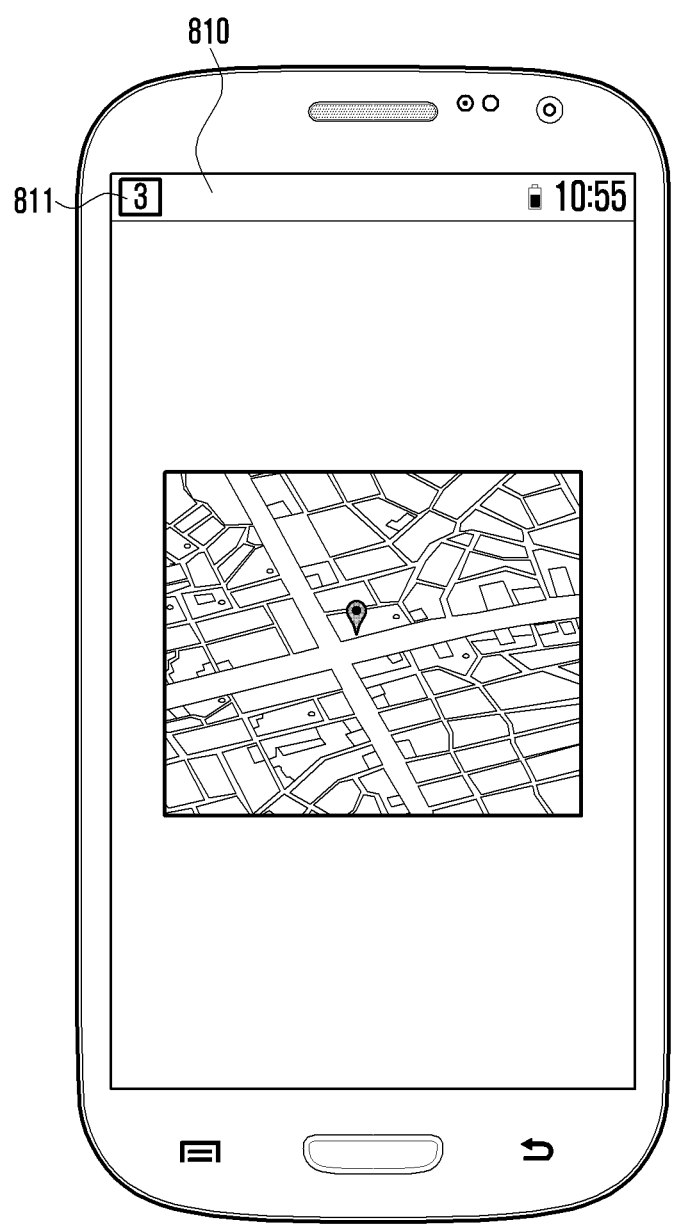
FIG. 8 illustrates an example notification screen according to a one embodiment of the present disclosure.

FIG. 7 is a flowchart illustrating an example method for processing a message according to various embodiments of the present disclosure. FIG. 8 illustrates an example notification screen according to the method for processing a message of FIG. 7.

Referring to FIG. 7, at operation 710, the controller 160 may receive a message from the external device through the wireless communication unit 140. At operation 720, the controller 160 may determine whether the source of message is known. If the source of message is known, the controller 160 may control the display unit 110 to display a message (i.e., registered message) at operation 730. If the source of message is not known, the controller 160 may control the display unit 110 to display information related to a message (i.e., unregistered message) at operation 740.

Referring to FIG. 8, related information 811 may be displayed in an area 810 indicating an operating state of the electronic device 100. The related information 811 may include, for example, a cumulative (e.g., count) number of unregistered messages stored in the unregistered message box 132*b* (e.g., "3" in the upper left hand corner of the display). The cumulative number may be classified and displayed as a number (e.g., "1," "2," 3," etc.) of unregistered messages which were displayed according to the user's input and the number (e.g., 2) of unregistered message the user indicated not to be displayed.

Figure 9:
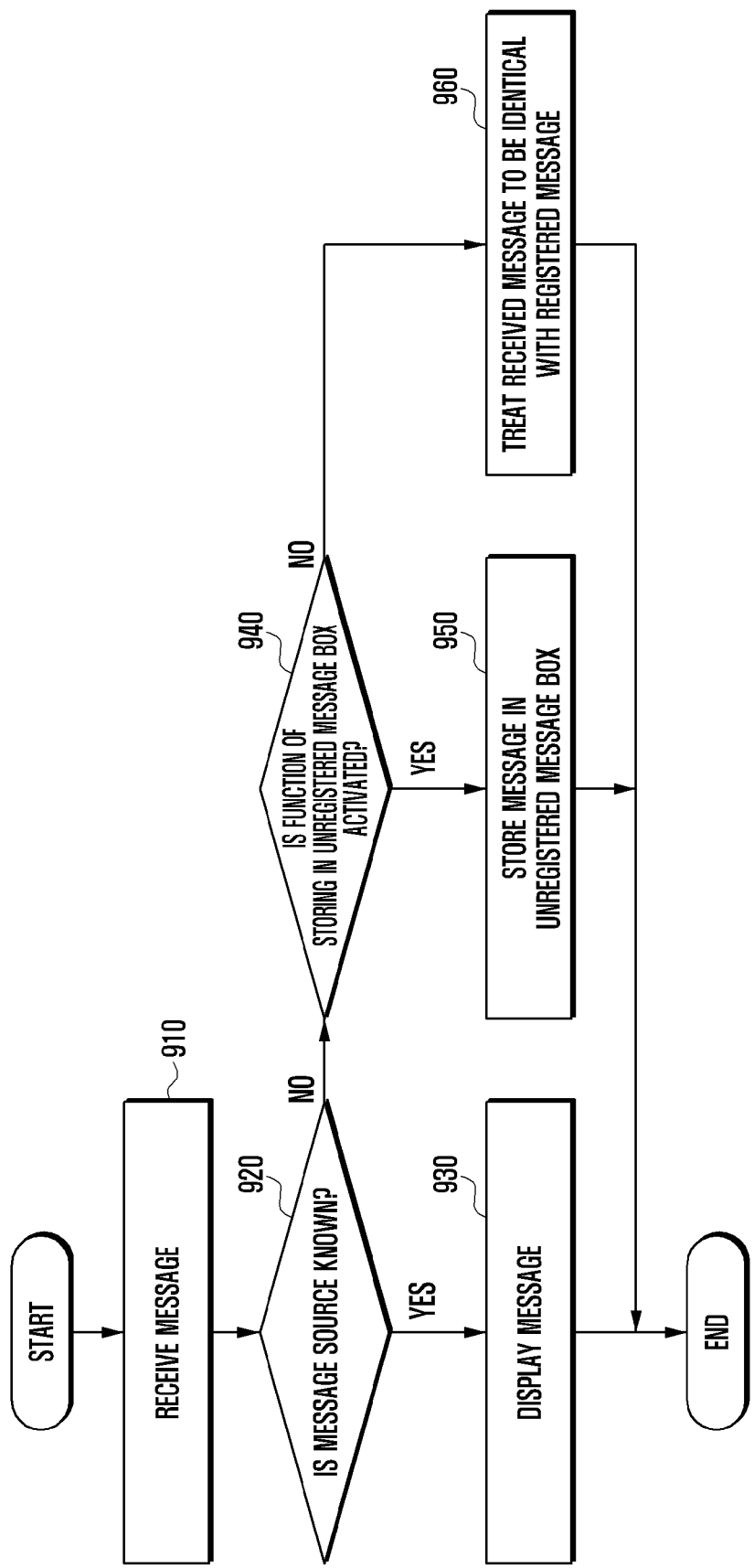
FIG. 9 is a flowchart illustrating an example method for processing a message according to various embodiments of the present disclosure.

FIG. 9 is a flowchart illustrating an example method for processing a message according to various embodiments of the present disclosure.

Referring to FIG. 9, at operation 910, the controller 160 may receive a message from the external device through the wireless communication unit 140. At operation 920, the controller 160 may determine whether the source of message is known. If the source of message is known, the controller 160 may control the display unit 110 to display a message (i.e., a registered message) at operation 930.

If the source of message is not known, at operation 940, the controller 160 may check setting information related to unregistered messages, which may be stored in the storage unit 130, and determine whether a function storing messages in an unregistered message box is activated. If the function of storing messages in an unregistered message box is activated, at operation 950, the controller 160 may store the message (i.e., the unregistered message) in the unregistered message box 132*b*.

If the function storing messages in the unregistered message box is not activated, at operation 960, the unregistered message may be treated identically with the registered message. For example, the controller 160 may control the display unit 110 to display at least a part of the unregistered message and the source information. If an entire display request is received from the input unit, in response to this, the controller 160 may control the display unit 110 to display the entire content of the unregistered message. As another example, the controller 160 may control the display unit 110 to display the source information of the unregistered message. If the message display request is received from the input unit, in response to this, the controller 160 may control the display unit 110 to display the entire content of the unregistered message.

Figure 10:
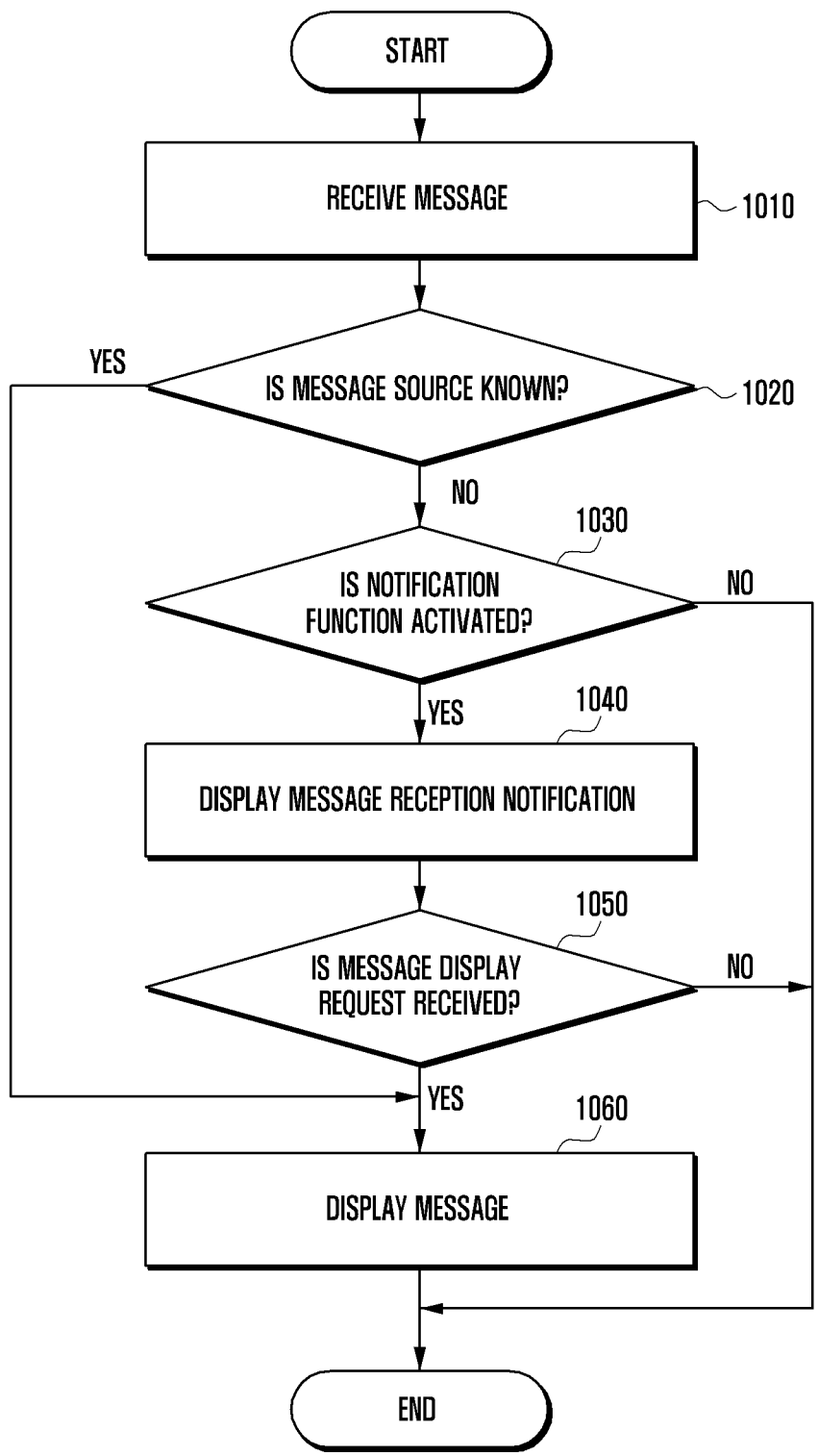
FIG. 10 is a flowchart illustrating an example method for processing a message according to various embodiments of the present disclosure.

FIG. 10 is a flowchart illustrating an example method for processing a message according to various embodiments of the present disclosure.

Referring to FIG. 10, at operation 1010, the controller 160 may receive a message from the external device through the wireless communication unit 140. At operation 1020, the controller 160 may determine whether the source of message is known.

If the source of message is known, the controller 160 may perform display of the message in operation 1060 (which will be described in more detail later).

If the source of message is not known, at operation 1030, the controller 160 may check setting information related to unregistered message, the setting information stored in the storage unit 130, and determine whether a notification function is activated.

If the notification function is activated, at operation 1040, the controller 160 may control the display unit 110 to display a message reception notification indicating that a message for which the source is not known has been received.

The controller 160 may determine whether a message display request is received from an input unit (e.g., as generated by a user in response to the message reception notification) at operation 1050.

If the message display request is received (e.g., by a user indicating that the message having an unknown source is to be displayed), the controller 160 may control the display unit 110 to display a message (i.e., the unregistered message) at operation 1060.

Tangentially, returning to the operation 1020, if the source of message is recognized or otherwise known, then the controller 160 may control the display unit 110 to display a message (i.e., as a registered message) in operation 1060.

Figure 11:
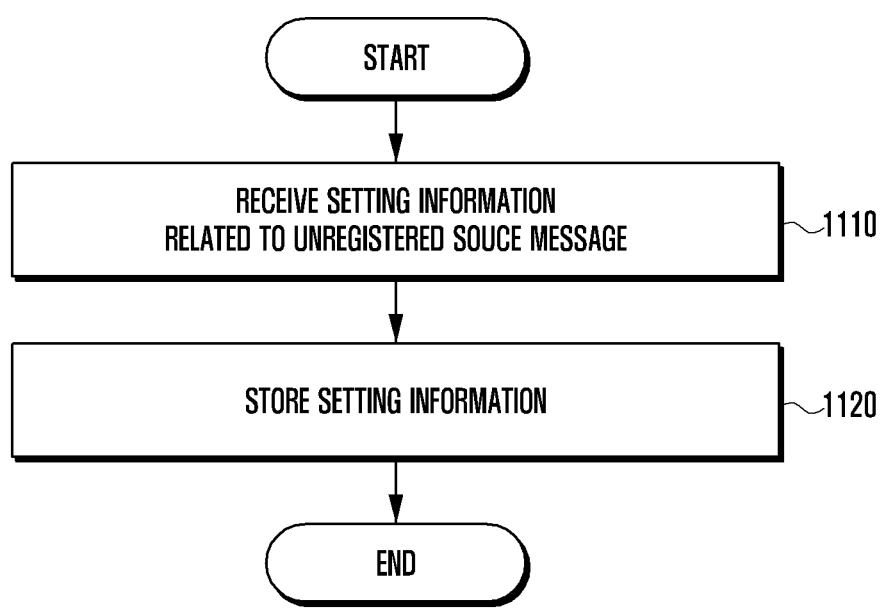
FIG. 11 is a flowchart illustrating a method for setting an environment in an electronic device according to various embodiments of the present disclosure.
Figure 12:
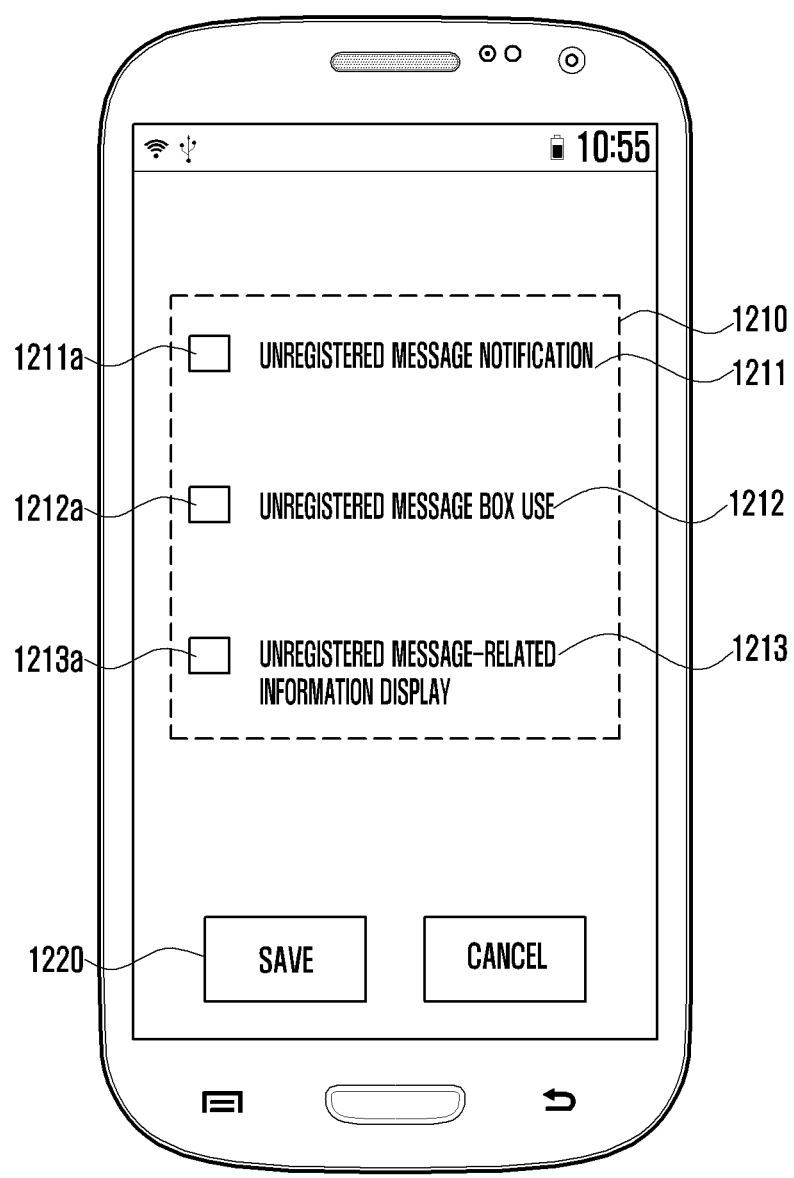
FIG. 12 illustrates an example interface screen for setting a method for processing an unregistered source message according to one embodiment of the present disclosure.

FIG. 11 is a flowchart illustrating an example method for setting an environment in an electronic device according to various embodiments of the present disclosure. FIG. 12 illustrates an example interface screen for setting a method for processing an unregistered message according to one embodiment of the present disclosure.

Referring to FIGS. 11 and 12, the display unit 110 may display interface information 1210 configured to allow a user to set the functions related to unregistered messages, as shown in FIG. 12. The interface information 1210 may include an item 1211 enabling a user to select (e.g. toggle a setting) activation of a notification function for unregistered messages (e.g., entitled in this example "unregistered message notification"), an item 1212 for selecting or toggling a function allowing registration of messages within an unregistered message box, and an item 1213 for selecting or toggling displaying of unregistered messages and related information (e.g., the cumulative number of unregistered message).

At operation 1110, the controller 160 may receive the setting information related to the unregistered message, as generated from inputs, for example, made to a touch screen.

At operation 1120, the controller 160 may store the received setting information in the storage unit 130 in response to, for example, a storage request event received from the touch screen.

For example, if the user selects a check box 1211*a* of the item 1211, the control unit 160 may control the display unit 110 to display a check shape, e.g., "√" in the check box 1211*a*. The "√" may also be indicated in other checkboxes 1212*a* and 1213*a* as indicated or designated by a respective selection by the user. If user selects a "save" button 1220, the controller 160 may activate the function corresponding to the selected (e.g., checked) item or items.

The present disclosure can provide a method for processing a message that can accurately filter out a message necessary for a user and an electronic device implementing the same.

The term "module" used in various embodiments of the present disclosure may refer to, for example, a "unit" including one of hardware, software, and firmware, or a combination of two or more thereof. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to various embodiments of the present disclosure may include at least one of an Application-Specific Integrated Circuit (ASIC) chip, a Field-Programmable Gate Arrays (FPGA), and a programmable-logic device for performing operations which has been registered or are to be developed hereinafter.

At least some of the devices (e.g., modules or functions thereof) or the method (e.g., operations) according to various embodiments of the present disclosure may be implemented by a command stored in a non-transitory computer-readable storage medium in a programming module form. If the command is executed by one or more processors (e.g., the processor), the one or more processors may execute a function corresponding to the command. The non-transitory computer-readable storage medium may be, for example, the storage unit 130. At least a part of the programming module may be implemented (e.g., executed) by, for example, a processor. At least a part of the programming module may include, for example, a module, a program, a routine, a set of instructions, or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (e.g., programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

The module or the programming module according to various embodiments of the present disclosure may include at least one or more of the above-described elements, omit some of the above-described elements, or may further include additional elements. The module, the programming module or operations performed by other element according to various embodiments of the present disclosure may be executed by a sequential, a parallel, an iterative, or a heuristic method. In addition, some operations may be executed in a different order, or omitted, or may add other operation.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that if accessed and executed by the computer, processor or hardware implement the processing methods described herein. In addition, it would be recognized that if a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". In addition, an artisan understands and appreciates that a "processor" or "microprocessor" may be hardware in the claimed disclosure. Under the broadest reasonable interpretation, the appended claims are statutory subject matter in compliance with 35 U.S.C. §101.

Various embodiments of the present disclosure disclosed in this specification and the drawings are provided for illustration purpose only and not for the purpose of limiting the present disclosure. Accordingly, it should be clearly understood that many variations and modifications of the basic inventive concepts herein taught which may appear to those skilled in the present art will still fall within the present disclosure.

What is claimed is:

1. A method for processing messages in an electronic device, comprising:
   receiving via a communication unit a message from an external device;
   if source information of the received message is unregistered in a message source list and a first function to display a notification is preconfigured as activated by a touch input, displaying by a display unit the notification to indicate that a filter-out message is received, the source information including at least one of a name and a phone number;
   determining by a processor whether a second function to activate filtering of unregistered messages is preconfigured as activated by a second touch input to store, as the filter-out message, any message received from any unknown source;

if the second function is preconfigured as activated by a second touch input, and the source information of the received message is unregistered in the message source list, storing the received message as the filter-out message; and if source information of at least one message stored as a filter-out message in an unregistered message box is added to a message source list, move the at least one message, associated with the source information, stored in the unregistered message box from the unregistered message box to a registered message box, wherein the first function and the second function are activated in response to detecting at least one touch input in displayed setting options including a first selectable option to activate the first function including displaying the notification, and a second selectable option to activate the second function.

2. The method of claim 1, further comprising:
displaying an icon representing a cumulative count of a number of received filter-out messages from a plurality of sources on a notification bar displayed on the display unit, the notification bar displayed to a terminal edge of the display unit.

3. The method of claim 1, further comprising:
if the source information is registered in the message source list, displaying on the display unit the source information.

4. The method of claim 1, wherein the filter-out message is classified according to attribute information of the received message.

5. The method of claim 1, wherein the filter-out message comprises an unregistered message that is not registered in the message source list.

6. The method of claim 1, wherein the displayed setting options further comprises a displayed graphic selectable via the touch input to indicate that the first function is activated, and the displayed graphic is visually altered in response to selection by the touch input.

7. The method of claim 1, further comprising displaying a pop-up window for the filter-out message, the pop-up window including display of at least a portion of a text of the filter-out message.

8. An electronic device, comprising:
a display unit;
a communication unit;
a storage unit; and
a control unit configured to:
store a message source list,
receive via the communication unit a message from an external device,
if source information of the received message is unregistered in the message source list and a first function to display a notification is preconfigured as activated by a touch input, display by the display unit the notification to indicate that a filter-out message is received,
determine whether a second function to activate filtering of unregistered messages is preconfigured as activated by a second touch input to store, as the filter-out message, any message received from any unknown source, the source information including at least one of a name and a phone number,
if the second function is preconfigured as activated by the second touch input, and the source information of the received message is unregistered in the message source list, store the received message as the filter-out message in the storage unit, and if source information of at least one message stored as a filter-out message in an unregistered message box is added to a message source list, moving the at least one message, associated with the source information, stored in the unregistered message box from the unregistered message box to a registered message box, wherein the first function and the second function are activated in response to detecting at least one touch input in displayed setting options including a first selectable option to activate the first function including displaying the notification, and a second selectable option to activate the second function.

9. The electronic device of claim 8, wherein the control unit is further configured to:
control the display unit to display an icon representing a cumulative count of a number of received filter-out messages on a notification bar displayed on the display unit, the notification bar displayed to a terminal edge of the display unit.

10. The electronic device of claim 8, wherein the control unit is further configured to:
if the source information is registered in the message source list, displaying on the display unit the source information.

11. The electronic device of claim 8, wherein the filter-out message is classified according to attribute information of the received message.

12. The electronic device of claim 8, wherein the filter-out message comprises an unregistered message that is not registered in the message source list.

13. The electronic device of claim 8, wherein the displayed setting options further comprises a displayed graphic selectable via the touch input to indicate that the first function is activated, the displayed graphic is visually altered in response to selection by the touch input.

14. A non-transitory computer-readable medium of an electronic device, including program instructions executable by a processor to cause the electronic device to:
receive via a communication unit a message from an external device,
if source information of the received message is unregistered in a message source list and a first function to display a notification is preconfigured as by a touch input, display by a display unit the notification to indicate that a filter-out message is received, the source information including at least one of a name and a phone number,
determine whether a second function to activate filtering of unregistered messages is preconfigured as activated by a second touch input to store, as the filter-out message, any message received from any unknown source,
if the second function is preconfigured as activated by the second touch input, and the source information of the received message is unregistered in the message source list, store the received message as the filter-out message, and
if source information of at least one message stored as a filter-out message in an unregistered message box is added to a message source list, move the at least one message, associated with the source information, stored in the unregistered message box from the unregistered message box to a registered message box,
wherein the first function and the second function are activated in response to detecting at least one touch input in displayed setting options including a first selectable option to activate the first function including displaying the notification, and a second selectable option to activate the second function.

15. The non-transitory computer-readable medium of claim 14, the program instructions further executable by the processor to:
control the display unit to display an icon representing a cumulative count of a number of received filter-out messages on a notification bar displayed on the display unit, the notification bar displayed to a terminal edge of the display unit.

16. An electronic device, comprising:
a display unit;
a communication unit;
a storage unit; and
a control unit configured to:
store a message source list having source information including at least one of a name and a phone number,
receive via the communication unit a message from an external device,
if source information of the received message is unregistered in the message source list and if a filter-out function is activated to manage messages received from unregistered sources as filter-out messages, store the received message as a filter-out message in the storage unit,
if a notification function is activated to display a notification of a message received from an unregistered source, display by the display unit the notification to indicate that the filter-out message is received, and
if source information of at least one message stored as a filter-out message is added to a message source list, manage the at least one message associated with the source information as a normal message,
wherein each of the filter-out function and the notification function is activatable in response to detecting a touch input via a first selectable option to activate the filter-out function and a second selectable option to activate the notification function to display the notification.

17. The electronic device of claim 16, wherein the control unit is further configured to:
control the display unit to display an icon representing a cumulative count of a number of received filter-out messages from a plurality of sources on a notification bar displayed on the display unit, the notification bar displayed to a terminal edge of the display unit.

18. The electronic device of claim 16, wherein the control unit is further configured to:
if the source information is registered in the message source list, control the display unit to display the source information.

19. The electronic device of claim 16, wherein the filter-out message is classified according to attribute information of the received message.

20. The electronic device of claim 16, wherein the filter-out message comprises an unregistered message that is not registered in the message source list.

21. A method in an electronic device, comprising:
receiving via a communication unit a message from an external device;
if source information of the received message is unregistered in a message source list and if a filter-out function is activated to manage messages received from unregistered sources as filter-out messages, storing the received message as a filter-out message in a storage unit;

if a notification function is activated to display a notification of a message received from an unregistered source, displaying by a display unit the notification to indicate that the filter-out message is received; and
if source information of at least one message stored as a filter-out message is added to a message source list, managing the at least one message associated with the source information as a normal message,
wherein each of the filter-out function and the notification function is activatable in response to detecting a touch input to the display unit via a displayed first selectable option to activate the filter-out function and a displayed second selectable option to activate the notification function to display the notification, and
wherein the source information includes at least one of a name and a telephone number.

22. The method of claim 21, further comprising:
displaying an icon representing a cumulative count of a number of received filter-out messages from a plurality of sources on a notification bar displayed on the display unit, the notification bar displayed to a terminal edge of the display unit.

23. The method of claim 21, further comprising:
if the source information is registered in the message source list, displaying on the display unit the source information.

24. The method of claim 21, wherein the filter-out message is classified according to attribute information of the received message.

25. The method of claim 21, wherein the filter-out message comprises an unregistered message that is not registered in the message source list.

26. A non-transitory computer readable medium storing sequences of instructions, and the sequences of instructions which, when executed by a processor, cause the processor to:
receive via a communication unit a message from an external device,
if source information of the received message is unregistered in a message source list and if a filter-out function is activated to manage messages received from unregistered sources as filter-out messages, store the received message as a filter-out message in a memory,
if a notification function is activated to display a notification of a message received from an unregistered source, control a display unit to display the notification to indicate that the filter-out message is received, and
if source information of at least one message stored as a filter-out message is added to a message source list, manage the at least one message associated with the source information as a normal message,
wherein each of the filter-out function and the notification function is activatable in response to detecting a touch input to the display unit via a displayed first selectable option to activate the filter-out function and a displayed second selectable option to activate the notification function to display the notification, and
wherein the source information includes at least one of a name and a telephone number.

27. The non-transitory computer readable medium of claim 26, the sequences of instructions further executable by the processor to:
control the display unit to display an icon representing a cumulative count of a number of received filter-out messages from a plurality of sources on a notification bar displayed on the display unit, the notification bar displayed to a terminal edge of the display unit.

28. The non-transitory computer readable medium of claim 26, the sequences of instructions further executable by the processor to:
    if the source information is registered in the message source list, control the display unit to display the source information.

29. The non-transitory computer readable medium of claim 26, wherein the filter-out message is classified according to attribute information of the received message.

30. The non-transitory computer readable medium of claim 26, wherein the filter-out message comprises an unregistered message that is not registered in the message source list.

\* \* \* \* \*